United States Patent Office 3,240,738
Patented Mar. 15, 1966

3,240,738
POLYVINYL ALCOHOL SPINNING COMPOSITION
AND METHOD
Akio Mitamura, Takeshi Akabane, Kigen Kawai, Osamu
Morimoto, Tadao Ashikaga, and Kenichi Tanabe, all of
Kurashiki, Japan, assignors to Kurashiki Rayon Co.,
Ltd., Okayama, Japan, a corporation of Japan
No Drawing. Filed Sept. 20, 1961, Ser. No. 139,373
Claims priority, application Japan, Sept. 28, 1960,
35/39,493; Dec. 23, 1960, 35/49,744
3 Claims. (Cl. 260—29.6)

The present invention relates to the production of polyvinyl alcohol fibers, and is more particularly concerned with novel polyvinyl alcohol spinning compositions and with a method which utilizes them in the preparation of polyvinyl alcohol fibers of improved characteristics.

It is well-known that polyvinyl alcohols have been conventionally manufactured by saponifying the polymers obtained by polymerizing vinyl esters of organic acids, particularly vinyl acetate. It has recently been found that polyvinyl alcohols obtained by saponifying vinyl ester polymers produced from vinyl acetate, or by using any other suitable vinyl ester of an organic acid, at reduced polymerization temperatures and in the presence of appropriate polymerization solvents, have more satisfactory crystalline properties and lower degrees of swelling in water in comparison with conventional polyvinyl alcohol, e.g. polyvinyl alcohol obtained by saponifying the polyvinyl acetate formed by polymerizing vinyl acetate at elevated temperatures. This is shown by way of example, in Table 1. The degree of polymerization of the polyvinyl alcohols shown in Table 1 is 1600–1750.

TABLE 1

| Vinyl acetate | | Degree of Swelling in Water of Polyvinyl Alcohol Films |
|---|---|---|
| Polymerization solvent | Polymerization temperature (° C.) | |
| None | 80 | 3.0 |
| Do | 60 | 2.6 |
| Ethyl acetate | 60 | 2.6 |
| Methanol | 60 | 2.2 |
| None | 40 | 2.1 |
| Do | 20 | 1.8 |
| Do | 0 | 1.7 |
| Do | −20 | 1.6 |
| Do | −40 | 1.5 |
| Do | −78 | 1.5 |

The degrees of swelling in water given in Table 1 are expressed as the value of the ratio $(W-W_0)/W_0$, where $W_0$ indicates the weight of the film which is obtained by pouring a 2% aqueous solution of polyvinyl alcohol on a hard board of polyvinyl chloride at 30° C. and subsequently drying it at 30° C. to form a film having a thickness of 0.2±.02 mm., the weight $W_0$ being measured after drying the film thus obtained in a desiccator containing $P_2O_5$ under a reduced pressure of 20 mm. Hg at 30° C. for 2 days, and W indicates the weight of the film measured immediately after lightly wiping off, with filter paper, the moisture on the surface of the film removed from a bath of water in which the film is immersed at 30° C. for a day.

Polyvinyl alcohol fibers are generally produced by wet-spinning, dry-spinning or extrusion-spinning of aqueous solutions of polyvinyl alcohol and subsequently drawing, heat-treating, or chemically treating the fibers thus spun. When, however, the polyvinyl alcohols having degrees of swelling of less than 2.0 are used, the spinning solutions containing these polyvinyl alcohols are unstable and have a tendency to increase in viscosity as well as to gelatinize. Consequently, because of the poor spinnability and unsatisfactory spinning characteristics of these solutions, it is difficult to effect a smooth spinning operation with them. This difficulty is aggravated by increasing viscosity of the original spinning solution as is the case when the concentration of the polyvinyl alcohol in the original solution is high or when the degree of polymerization of the polyvinyl alcohol used is high. Usually, the difficulty in spinning referred to above is even more pronounced in the case of dry-spinning and extrusion spinning than in wet-spinning. Indeed, in many cases, spinning is rendered completely impracticable. It has been proposed to correct this difficulty in the case of spinning solutions used for wet-spinning operations by the use of n-propanol ("Collection of Summaries of Lectures at the 13th Annual Meeting of Japan Chemical Society," p. 222, 7K85). However, it has been established that this method, while improving the wet-spinning operation somewhat, does not furnish a satisfactory solution in the case of dry-spinning and extrusion spinning processes.

It is an object of the present invention to provide means for avoiding the foregoing drawbacks and disadvantages in the spinning of polyvinyl alcohol fibers.

It is a further object of the invention to provide polyvinyl alcohol spinning compositions from which polyvinyl alcohol fibers having desirable properties can be produced and which permit the utilization of polyvinyl alcohols of high crystalline properties without the difficulties referred to above.

In accordance with the present invention, there are provided polyvinyl alcohol spinning compositions, e.g. aqueous polyvinyl alcohol spinning solutions, containing a urea compound, more particularly thiourea, cyclic ethylene thiourea, cyclic propylene thiourea, cyclic ethylene urea, cyclic propylene urea, triazone and the water-soluble oxy-, alkyl-, and aryl derivatives, the polyvinyl alcohol having a degree of swelling in water of less than 2.0, as determined from the ratio set forth above by the method described. The urea compound surprisingly inhibits changes in viscosity of the aqueous solution of the polyvinyl alcohol upon standing, the tendency of gelatinization is greatly diminished, the spinnability is improved, and it is possible to carry out smooth spinning operations of all types with these solutions with the ease experienced in the case of conventional spinning operations with polyvinyl alcohols which do not have low degrees of swelling in water.

The polyvinyl alcohol fibers obtained by the use of these solutions are excellent in heat-resistance, hot water resistance and mechanical properties yet they can be smoothly spun even though spinning would be difficult or impossible from conventional spinning solutions. Thus, even with polyvinyl alcohols of high crystallinity, which are difficult to spin because of their high gelling tendency, the inclusion of urea additives in aqueous solutions of these polymers noticeably reduces this gelling tendency, and permits satisfactory spinning, with the result that it has become possible to retain the characteristics of the polyvinyl alcohols of high crystallinity in the fibers produced.

The produced fibers can be subsequently subjected to after-treatments such as drawing, heat-treatments, chemical treatment, or the like, in conventional manner.

The amounts of the urea compound used can vary and is influenced by the crystalline properties, the degree of swelling in water, and the degree of polymerization of the polyvinyl alcohol used, the concentration and viscosity of the original spinning solution, as well as the method of spinning, e.g. wet-spinning, dry-spinning, or extrusion spinning, to be employed. Generally speaking, it is necessary to use 0.02–20% by weight of the urea compound based on the weight of the polyvinyl alcohol in the spinning composition, e.g. spinning solution, and preferably 0.2–5% by weight is employed. As a general rule more of the urea compound is employed with increased crystallinity, decreased degree of swelling, and increased degree of polymerization, concentration, and viscosity. More urea compound is also used in the case of dry-spinning or extrusion spinning.

As previously mentioned, the particularly effective additives employed in connection with the present invention are thiourea, cyclic ethylene thiourea, cyclic propylene thiourea, cyclic ethylene urea, cyclic propylene urea, triagone, and the specified water-soluble derivatives of these compounds. Examples of such derivatives are 1,3-dimethylimidazolidone-2,4-dimethylimidazolidone, 4,5-dimethylimidazolidone, N,N' - methylenebisethylene-urea, the long-chain water-soluble polymer by methylene bonding of ethylene-urea and formaldehyde, 2,2'-thio-di-2-imidazolidone, 1,3-diethylimidazolidine-2-thione, 1-phenyl-thio-imidazolidone-2,4,5-dioxyimidazolidone, N-dimethyl thiourea, 5-ethyl-triazone, and the like.

The action of the spinning solutions of the present invention is most readily observed by viewing the action of the spinning solution itself and by effecting the spinning of fibers by concentional spinning operations, especially dry or extrusion spinning operations. The behavior of the solution is readily expressed in terms of variations in viscosity upon letting the original spinning solution stand. This is shown by the test results set forth in Table 2. The polyvinyl alcohol used (degree of polymerization of 1500–1600) was the saponified product of polyvinyl acetate polymerized at 0° C., and had a degree of swelling of 1.7. As a control, an ordinary polyvinyl alcohol having a degree of swelling of 2.5 and prepared from polyvinyl alcohol polymerized at 60° C. was used. The behavior of the solutions is expressed as the rate of increased in viscosity when a solution for wet-spinning and containing 15% polyvinyl alcohol is left standing at 30° C. for ten hours. The maximum possible take up velocity when the spinning solution, allowed to stand at 80° C. for one day and night, is wet spun into a ocagulation bath of Glauber's salt, is also set forth in Table 2.

TABLE 2

| Degree of Swelling of Polyvinyl Alcohol | Additives | Quantity of additive percent | Rates of increase in viscosity | Maximum taking-up velocity (m./min). |
| --- | --- | --- | --- | --- |
| 2.5 | None | | 1.16 | 100 |
| 1.7 | do | | 3.12 | 60 |
| 1.7 | Cyclic ethylene thiourea. | 0.2 | 2.63 | 85 |
| 1.7 | do | 1.0 | 1.28 | 120 |
| 1.7 | do | 5.0 | 1.15 | 130 |
| 1.7 | Thiourea | 1.0 | 1.38 | 120 |
| 1.7 | Cyclic ethylene urea. | 1.0 | 1.55 | 115 |
| 1.7 | n-Propanol | 1.0 | 2.85 | 90 |

The effect of this invention is most noticable with highly concentrated aqueous polyvinyl alcohol solutions or with aqueous solutions of highly polymerized polyvinyl alcohol in the case of dry or extrusion spinning. The degree of spinnability improvement in the case of dry spinning is shown in Table 3 below. The polyvinyl alcohol used is polyvinyl alcohol of 1700 mean degree of polymerization, obtained by saponifying polyvinyl acetate polymerized by the conventional process.

TABLE 3

| Additive | Amount of additive percent | Maximum taking-up speed (m./min.) |
| --- | --- | --- |
| None | | 90 |
| Sodium-dodecylbenzenesulfonate | 0.05 | 100 |
| Cyclic-ethylene-thiourea | 0.2 | 130 |
| Do | 1.0 | 150 |
| Do | 5.0 | 155 |
| Do | 1.0 } | 170 |
| Sodium-dodecylbenzenesulfonate | 0.1 | |
| Thiourea | 1.0 | 155 |
| Cyclic-propylene-thiourea | 1.0 | 160 |
| Cyclic-ethylene-urea | 1.0 | 145 |
| 2,4-dimethylimidazolidone | 1.0 | 150 |

As shown in Tables 2 and 3, effects of the additives pertaining to the present invention may clearly be observed both in dry-spinning and in wet-spinning. Moreover, the effects mentioned above become particularly remarkable in dry-spinning or extrusion spinning as seen from Table 3. Satisfactory spinning was impracticable without the additives of the present invention. Furthermore, it has been found that the additives of this invention, when used in combination with known surface active agents, which are known to have the effect of improving the spinnability in the dry spinning, will become still more effective.

In effecting extrusion-spinning, the known method of charging the hydrous polyvinyl alcohol mass into an extruder is the most popularly practiced technique at present. In the case of the spinning compositions of the present invention, it is preferable to charge the hydrous polyvinyl alcohol into the extruder after it has been mixed with the additive of the present invention. Preferably, the polyvinyl alcohol mass is charged into the extruder by previously impregnating it with the urea compound so that it will have the desired water-content and additive-content when charged.

It was known that fibers obtained from polyvinyl alcohol having relatively high crystalline properties are endowed with superior properties in comparison with ordinary polyvinyl alcohol fibers. The properties of the fibers obtained by the use of urea additives, in accordance with the present invention, are not substantially changed in comparison with the polyvinyl alcohol subjected to spinning and are entirely satisfactory. Generally, it is desirable to increase the temperature of subsequent heat-treatment in the case of fibers from polyvinyl alcohol having high crystalline properties in comparison with those from ordinary polyvinyl alcohols. It may be difficult to obtain fibers of sufficiently excellent properties when the fibers made of the polyvinyl alcohol having high crystalline properties are treated at heat-drawing temperatures used for ordinary polyvinyl alcohol fibers. One of the features of the present invention is that discoloration of the fibers at the time of heat-treatment is prevented by reason of the urea additive in the spinning composition, especially when thiourea, cyclic ethylene thiourea, cyclic propylene thiourea, or their derivatives are used. This fact is of important practical significance in view of the above-mentioned requirement that more severe heat-treatment is desirable for fibers formed from polyvinyl alcohol of particularly good crystalline properties.

This action of the urea additives is shown in Tables 4 and 4A. As the samples of polyvinyl alcohols, those shown in Table 2 were used. The original spinning solutions containing the polyvinyl alcohol of a degree of polymerization of 1500–1600 at a concentration of 32% were dry-spun into air, in accordance with conventional techniques, and the resulting fibers were heat-drawn to the maximum possible extent. The fibers were then heat-treated at constant length to determine various properties.

TABLE 4

| Degree of Swelling of Polyvinyl Alcohol | Additives | Quantity added (percent) | Temperature of heat-drawing | Heat-drawing rate (percent) | Discoloring |
| --- | --- | --- | --- | --- | --- |
| 2.5 | None | ---- | 220 | 800 | Slightly yellow. |
| 2.5 | ---do--- | ---- | 230 | 900 | Pale yellow. |
| 2.5 | ---do--- | ---- | 240 | 800 | Yellow. |
| 1.7 | ---do--- | ---- | Spinning impossible | | |
| 1.7 | Cyclic ethylene thiourea. | 1.0 | 240 | 1,200 | Slightly yellow. |
| 1.7 | Thiourea | 1.0 | 240 | 1,250 | Do. |
| 1.7 | Cyclic ethylene urea. | 1.0 | 220 | 900 | Do. |
| 1.7 | ---do--- | 1.0 | 230 | 950 | Pale yellow. |
| 1.7 | ---do--- | 1.0 | 240 | 1,100 | Yellow. |

TABLE 4A

| Softening point in water (° C.) | Tenacity (g./d.) | Elongation (percent) | Tenacity after treatment at 180° C. for 4 hours (g./d.) | Tenacity holding rate after treatment at 180° C. for 4 hours (percent) |
| --- | --- | --- | --- | --- |
| 94 | 6.4 | 11.1 | 4.5 | 70 |
| 98 | 7.2 | 7.5 | 5.1 | 71 |
| 97 | 5.8 | 7.7 | 3.6 | 62 |
| 114 | 8.9 | 6.2 | 7.7 | 87 |
| 115 | 9.0 | 5.5 | 7.9 | 88 |
| 99 | 7.2 | 7.8 | 5.6 | 78 |
| 104 | 7.7 | 7.5 | 6.1 | 79 |
| 107 | 8.0 | 8.2 | 6.5 | 81 |

Table 5 shows the effects of the invention with a polyvinyl alcohol of 1700 mean degree of polymerization obtained by conventional methods. A spinning solution of 33% concentration was dry spun into air. The resultant fibers were heat stretched to the maximum (at 230° C., for period of 5 seconds) and heat-treated under constant length at the same temperature, and their various properties were measured.

TABLE 5

| Additives | Amt. of addition (percent) | Maximum rate of heat stretch (percent) | Discoloratin after heat treatment | Softening point in water (° C.) | Tenacity (g./d.) | Elongation (percent) | Tenacity after 4 hours at 480° C. (g./d.) | Tenacity retention (percent) |
| --- | --- | --- | --- | --- | --- | --- | --- | --- |
| None | ---- | 850 | Weak yellow | 96 | 7.2 | 7.5 | 5.1 | 71 |
| Sodium-dodecylbenzene-sulfonate. | 0.05 | 950 | ---do--- | 96 | 7.5 | 7.2 | 5.2 | 69.5 |
| Cyclic-ethylene-urea | 1.0 | 1,100 | ---do--- | 107 | 8.5 | 7.3 | 6.2 | 73 |
| Cyclic-ethylene-thiourea | 1.0 | 1,200 | Slight yellow. | 110 | 8.7 | 7.0 | 7.45 | 85.5 |
| Thiourea | 1.0 | 1,150 | ---do--- | 105 | 8.3 | 7.5 | 7.15 | 86 |
| Cyclic-ethylene-thiourea | 1.0 | | | | | | | |
| Sodium-dodecylbenzene-sulfonate. | 0.05 | 1,250 | ---do--- | 113 | 9.0 | 6.8 | 7.95 | 88 |

As shown in Tables 4, 4A and 5, whereas heat-drawing at an elevated temperature leads to rather unsatisfactory results in the case of ordinary polyvinyl alcohols, the drawing at an elevated temperature results in the increased rate of heat-drawing and superb properties in the case of the polyvinyl alcohol of low swelling properties. In this case, discoloring due to heat-treatment may be increased, but the additives of the invention suppress it. Furthermore, the advantage is realized that, in the fibers produced, the reduction in strength due to heating at an elevated temperature is minimized. In those cases where no additive was used, no satisfactory samples were collected in the attempted dry-spinning of the polyvinyl alcohol having a low swelling property, because of poor spinnability.

Table 5 further shows that the additives of this invention exhibit increased effects when they are jointly used with surface active agents, and the filaments obtained have excellent performance characteristics. When cyclic ethylene-thiourea, thiourea, cyclic propylene-thiourea, and their derivaties are added, the advantages are that the discoloration is slight, and that the degradation due to heating at high temperatures in the tenacity of filaments obtained is small.

Any of the known surface active agents, whether anionic, cationic, nonionic, or amphoteric, may be used in combination with the additives of this invention to obtain the effect of improving the spinnability and heat stretch ability, and such agents are preferably used in the amount of 0.01–0.5% by weight of the spinning solution.

Moreover, the effects of preventing discoloration due to heating and improving heat-resistance by the use of cyclic ethylene thiourea, thiourea, cyclic-propylene-thiourea, and their water-soluble derivatives are also obtainable by impregnating the fibers with these compounds after spinning. The effectiveness of these urea additives is apparent when the content of these compounds in the fiber is within a range of 0.01–10% by weight, preferably 0.05 to 5% by weight. It will of course be understood that the present invention is applicable to all polyvinyl alcohols although it is of particular significance in the case of polyvinyl alcohols having a low degree of swelling.

The invention will be further understood from the following specific examples of practical application. However, it will be understood that these examples are not to be construed as limiting the scope of the present invention in any manner. In these examples, all parts are by weight, unless otherwise indicated.

*Example 1*

An aqueous solution containing 15% of polyvinyl alcohol (average degree of polymerization of 1700) and obtained by saponifying polyvinyl acetate photopolymerized at −40° C. and having a degree of swelling in water of 1.3, and 3% of 4,5-dioxyimidazolidone (based on the amount of polyvinyl alcohol) was wet-spun into an aqueous solution containing Glauber's salt at a rate of 400 g./l. at 45° C. The resulting fibers were drawn through rollers by 200% and dried by heating.

The fibers thus obtained were then heat-drawn to the maximum possible extent in an air bath at 240° C. for 5 seconds (drawing rate: 1200% in relation to the fiber after leaving the bath). Subsequently, the fibers were heat-treated while allowing 15% contraction in an air bath at 245° C.

These fibers had a tenacity of 10.5 g./d. an elongation of 12.5% and a softening point in water of 120° C. In the case of control fibers produced in the same way from a solution to which no 4,5-dioxyimidazolidone was added, the heat-drawability was poor and the maximum heat-drawing rate was 700%. The properties mentioned above were 6.3 g./d., 14.7% and 92° C., respectively in the case of the control fibers. The fibers of the present invention thus had a tenacity and water-resistance which were substantially superior to those of ordinary polyvinyl alcohol fibers.

*Example 2*

An aqueous solution containing 35% of polyvinyl alcohol obtained by saponifying polyvinyl acetate photopolymerized at 0° C. and having a degree of swelling in water of 1.6 (average degree of polymerization: 1600), and 1% of cyclic ethylene thiourea (based on the amount of polyvinyl alcohol), was dry-spun in air.

When a control solution to which no cyclic ethylene thiourea was added was tested, gelatinization was caused and spinnability was poor, thereby making the spinning operation difficult. On the other hand, the spinning of the solution containing the thiourea derivative was smoothly accomplished.

After heat-drawing the produced fibers in an air bath at 240° C. and 5 seconds (heat-drawing rate: 1200%), the fibers were heat-treated while allowed to contract by 10% in an air bath at 245° C. The filament yarn thus obtained had a tenacity of 9.1 g./d., an elongation of 10.2%, a softening point in water of 115° C., and a resistance against creep failure of about 9 hours. The creep-failure value is the time until the sample is cut, when it is loaded at a rate of 1.5 g. per denier and in this state hung in an air bath at 160°.

*Example 3*

A mixture consisting of 45% of polyvinyl alcohol having a degree of swelling in water of 1.5 (average degree of polymerization of 1600), 2.0% of N-dimethyl thiourea (based on the amount of the polyvinyl alcohol) and 54.1% of water, was extrusion-spun by the use of an extruder. After heat-drawing the thus-produced fibers to the maximum extent in polyethylene glycol at 240° C., the fibers were heat-treated while allowed to contract by 10% in polyethylene glycol at 245° C. The filament yarn thus obtained had a tenacity of 10.2 g./l., an elongation of 9.5%, and a softening point in water of 113° C. This polyvinyl alcohol could not be spun smoothly without the presence of the thiourea additive.

*Example 4*

An aqueous solution containing 15% of polyvinyl alcohol having a degree of swelling in water of 1.4 and an average degree of polymerization of 1800, and 5.0% of cyclic propylene thiourea, was wet spun into an aqueous solution containing Glauber's salt at a rate of 420 g./l. at 40° C. The resulting fibers were subjected to drawing through rollers by 350% and were subsequently dried by heating. After heat-drawing these fibers to the maximum extent in an air bath at 235° C. (drawing rate after leaving the bath: 1200%), the fibers were heat-treated while allowed to contract by 15% in an air bath at 240° C. The fibers thus obtained were formalized in an aqueous solution containing 5% of formaldehyde, 15% of sulfuric acid and 15% of Glauber's salt, at 70° C. for 1 hour.

These fibers had a dry-tensile tenacity and an elongation of 9.3 g./d. and 14%, respectively, a wet-knotting tenacity and an elongation of 7.2 g./d. and 10.3%, respectively, as well as a softening point in water of 130° C. The properties mentioned above fibers produced in identical manner but without the use of cyclic propylene urea had values of 7.2 g./d., 13.8%, 5.1 g./d., 9.8% and 117° C., respectively. The properties of the fibers produced in accordance with this invention were clearly superior.

*Example 5*

An aqueous solution containing 30% of polyvinyl alcohol having an average degree of polymerization of 2600 and a degree of swelling in water of 1.6, and 2.5% of cyclic ethylene urea (based on the amount of polyvinyl alcohol) was dry-spun in air.

After heat-drawing these fibers to the maximum extent in an air bath at 250° C. (maximum heat-drawing rate: 1100%), the fibers were heat-treated while allowed to contract by 15% in an air bath at 255° C. The filament yarn thus obtained had a tenacity of 8.5 g./d., an elongation of 11.3%, a softening point in water of 110° C., and a resistance against creep failure of 8 hours (loading rate: 2.5 g./d., temperature: 160° C.).

*Example 6*

Using as the spinning solution an aqueous solution containing 15% of polyvinyl alcohol of 1600 average degree of polymerization and 3.0% cyclic ethylene-urea (based on the polyvinyl alcohol), fibers were produced by spinning the solution into an aqueous solution containing 420 g./l. Glauber's salt at 45° C., and the resultant fibers were roller stretchced 200%, and then heat dried. The fibers obtained in this manner were heat-stretched to the maximum (1100% based on the velocity at which they emerged from coagulation bath), for 5 seconds in an air bath at 235° C., and then heat-treated at constant length in an air bath at 240° C. The tenacity of these fibers was 11.3 g./d., their elongation was 7.6%, and their softening point in water was 105° C. These values compare favorably with the respective properties of the control fibers, which were produced from a spinning solution to which no additive was added, and which were 9.8 g./d., 7.8%, and 98° C., respectively, taken at 900% maximum heat drawing ratio (based on the velocity at which the fibers emerged from coagulation bath).

*Example 7*

An aqueous solution containing 30% of polyvinyl alcohol of 1800 average degree of polymerization and 1.0% (based on the polyvinyl alcohol) of cyclic propylene-thiourea was dry spun into air. The thus-produced fibers were heat-stretched to the maximum (1200% heat drawing ratio) for 10 seconds in air at 230° C., and then heat-treated while allowing 15% shrinkage at 235° C. in air. The tenacity of the fibers obtained in this manner was 8 g./d., their elongation was 13.4%, and their softening point in water was 110° C. These values show the excellent tenacity, elongation, and hot-water resistance of the fibers as compared with the respective properties of control fibers produced from a spinning solution containing no additive and whose properties were 6.4 g./d., 14%, and 102° C., respectively, measured at 950% maximum heat drawing ratio.

The heat-treated fiber was light yellow rather than yellow in disloration by reason of the addition of propylene-thiourea, and the tenacity retention after 4 hours heating at 180° C. improved from 70% to 85%.

*Example 8*

Two aqueous solutions containing 28% of polyvinyl alcohol of 2100 average degree of polymerization, 1.5% of 1,3-dimethylimidazolidone, 0.1% of laurylpyridinium-bromide or polyoxyethylenelaurate (all proportions based on the polyvinyl alcohol) were dry spun into air. The thus-produced fibers were heat-stretched to the maximum (1250% heat drawing ratio) for 5 seconds in a fused Wood's metal bath, and were then heat-treated while allowing 10% shrinkage in a fused Wood's metal at 235° C. The tenacity of the fibers obtained in this manner was 8.3 and 8.7 g./d., their elongation was 10.0 and 9.2%; and their water-resistance (softening point in water) was 105 and 107° C.

*Example 9*

A mixture consisting of 45% of polyvinyl alcohol of 1600 average degree of polymerization, 1.0% (based on the polyvinyl alcohol) of thiourea, and 50.5% of water, was extrusion spun through an extruder.

The resultant fibers were heat-stretched to the maximum (1150%) in polyethylene glycol at 230° C. and were then heat-treated in polyethylene glycol at 235° C. while allowing 10% shrinkage. The tenacity of the fibers obtained in this manned was 9.5 g./d., their elongation was 9.3%, and their softening point in water was 108° C.

In contrast, the respective properties of the control fibers, produced from a mixture to which no thiourea was added, were 8.1 g./d., 9.0%, and 102° C., measured at maximum heat drawing ratio of 950%. The above figures show the excellent tenacity and water-resistance of fibers produced according to the present invention.

The conditions and relative relationships set forth in the examples are those preferred but it will be understood that other conditions and relationships may be used within the scope of the invention. In general, unless otherwise indicated, conventional operations and techniques are suitably employed, and the content of polyvinyl alcohol in the spinning composition corresponds to that conventionally used for the type of spinning operation to be followed.

Thus, any polyvinyl alcohol suitable for spinning into fibers may be used.

The polyvinyl alcohol suitable for use in accordance with the present invention is known polyvinyl alcohol and includes polymers composed principally of the vinyl alcohol radical. Polyvinyl alcohol is a polymer containing hydroxyl groups and corresponding to the formula:

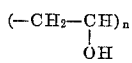

wherein $n$ is an integer which can vary within wide limits, as is well-known in the art. Polyvinyl alcohol can be produced from the corresponding polyvinyl ester, e.g. polyvinyl acetate, by alkaline or acid saponification or re-esterificatiaon, i.e. alcoholysis.

Typical polyvinyl alcohols which can be suitably used are described, for example, in Cline et al. U.S. Patent 2,636,803. Preferably the polyvinyl alcohol has a degree of polymerization of at least about 500, and the invention is of particular value when the polyvinyl alcohol has a degree of swelling in water of less than 2.0.

To form fibers, the polymeric compositions are spun in conventional manner, e.g. by extruding the solution through small holes in a spinning jet into a medium effective to remove water therefrom. In wet spinning processes the medium can, for example, be a concentrated aqueous solution of a coagulating salt such as sodium sulfate or ammonium sulfate, while in dry spinning techniques air or in inert gas such as nitrogen is employed.

Suitable spinning conditions for producing fibers from the spinning solutions of this invention include those described, for example, in U.S. Patent 2,642,333 as well as in Cline et al. U.S. Patent 2,636,803 and Osugi et al. U.S. Patent 2,906,594.

The fibers may suitably be stretched and heat treated in accordance with conventional techniques as illustrated, for example, in U.S. Patents 2,636,803, 2,636,804 and 2,906,594. Thus, the fibers are suitably stretched to a draw ratio of about 2:1 to 12:1 during or after spinning. For wet spun filaments, the stretching can be carried out directly after spinning while the fibers are wet at room temperature up to 100° C. to a draw ratio of about 5:1. For stretching to higher draw ratios, it is preferred to conduct the stretching in a heated medium such as air at 100–250° C.

Heat treatment is usually carried out by heating the fibers in a medium such as air at 210–250° C. for 2 seconds to 5 minutes.

For the purpose of insolubilization, not only acetalization by the use of alkyl, aralyl and aromatic aldehydes such as formaldehyde, acetaldehyde, butylaldehyde, nonylaldehyde, benzaldehyde, monochlorobenzaldehyde, naphthaldehyde, malonaldehyde, glutaldehyde, terephthaldehyde, and the like is suitably effected, but conventional treatments by means of inorganic substances such as titanization, chroming, and the like can be employed.

Acetalization, for example, is conveniently carried out in conventional manner in an aqueous solution containing 0.2–10% aldehyde, 5–20% sulfuric acid and 0–25% sodium sulfate or ammonium sulfate at temperatures of 40–80° C. for times ranging from a few minutes, e.g. 10 minutes, to several hours, e.g. 5 hours.

The polymers contained in the spinning compositions of this invention are similarly formed into other shapes such as films by conventional technques. Thus, films are suitably produced by the procedure described, for example, in Izard et al. U.S. 2,236,061 and in Herrmann et al. U.S. Patent 2,837,770.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:

1. In the manufacture of polyvinyl alcohol fibers, the steps which comprise preparing a spinning composition of good spinning characteristics comprising an aqueous mixture of polyvinyl alcohol and a minor amount but at least about 0.02% by weight of said polyvinyl alcohol of urea derivative, and spinning said composition to form fibers therefrom, said urea derivative being selected from the group consisting of thiourea, cyclic ethylene thiourea, cyclic propylene thiourea, cyclic ethylene urea, cyclic propylene urea, triazone, and the water-soluble oxy-, alkyl-, and aryl-derivatives thereof.

2. In the manufacture of polyvinyl alcohol fibers, the steps which comprise preparing a spinning composition of good spinning characteristics comprising an aqueous mixture of polyvinyl alcohol and a minor amount but at least about 0.02% by weight of said polyvinyl alcohol of urea derivative, and spinning said composition to form fibers therefrom, said urea derivative being selected from the group consisting of thiourea, cyclic ethylene thiourea, cyclic propylene thiourea, cyclic ethylene urea, cyclic propylene urea, triazone, and the water-soluble oxy-, alkyl-, and aryl-derivatives thereof, and said polyvinyl alcohol having a degree of swelling in water of less than 2.0.

3. A spinning composition effective to be spun into fibers and characterized by good spinning characteristics comprising an aqueous mixture of a major proportion of polyvinyl alcohol and a minor proportion but at least about 0.02% by weight of said polyvinyl alcohol of a urea derivative, said urea derivative being selected from the group consisting of thiourea, cyclic ethylene thiourea, cyclic propylene thiourea, cyclic ethylene urea, cyclic propylene urea, triazone, and the water-soluble oxy-, alkyl-, and aryl-derivatives thereof.

References Cited by the Examiner

UNITED STATES PATENTS 2,430,499 11/1947 Esselen _____ 260—29.6
2,890,180 6/1959 Cerny et al. _____ 260—91.3

OTHER REFERENCES

Jones: British Plastics, vol. 16, No. 178, pp. 125 and 128.

SAMUEL H. BLECH, *Primary Examiner.*

LEON J. BERCOVITZ, MURRAY TILLMAN,
*Examiners.*